(12) United States Patent
Duelm et al.

(10) Patent No.: US 10,578,120 B2
(45) Date of Patent: *Mar. 3, 2020

(54) LOW PROFILE FAN PLATFORM ATTACHMENT

(71) Applicant: United Technologies Corporation, Farmington, CT (US)

(72) Inventors: Shelton O. Duelm, Wethersfield, CT (US); Christopher M. Quinn, Middletown, CT (US); Charles W. Brown, East Hampton, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 63 days.

This patent is subject to a terminal disclaimer.

(21) Appl. No.: 15/672,583

(22) Filed: Aug. 9, 2017

(65) Prior Publication Data

US 2017/0335859 A1 Nov. 23, 2017

Related U.S. Application Data

(63) Continuation of application No. 14/171,093, filed on Feb. 3, 2014, now Pat. No. 9,759,226.

(60) Provisional application No. 61/765,199, filed on Feb. 15, 2013.

(51) Int. Cl.
| | |
|---|---|
| *F04D 29/32* | (2006.01) |
| *F04D 29/02* | (2006.01) |
| *F01D 5/30* | (2006.01) |
| *F01D 11/00* | (2006.01) |
| *F01D 5/32* | (2006.01) |

(52) U.S. Cl.
CPC ......... *F04D 29/322* (2013.01); *F01D 5/3007* (2013.01); *F01D 11/008* (2013.01); *F04D 29/023* (2013.01); *F01D 5/3053* (2013.01); *F01D 5/323* (2013.01); *F04D 29/329* (2013.01); *F05D 2220/36* (2013.01); *F05D 2230/10* (2013.01); *F05D 2230/64* (2013.01); *F05D 2300/43* (2013.01); *F05D 2300/603* (2013.01); *Y02T 50/672* (2013.01)

(58) Field of Classification Search
CPC ........ F01D 5/30; F01D 5/3053; F01D 5/3007; F01D 5/32; F01D 5/323; F01D 5/326
USPC .......................................... 416/219 R, 220 R
See application file for complete search history.

(56) References Cited

U.S. PATENT DOCUMENTS

| | | |
|---|---|---|
| 5,277,548 A | 1/1994 | Klein et al. |
| 5,350,279 A | 9/1994 | Prentice et al. |
| 5,501,575 A | 3/1996 | Eldredge et al. |
| 6,416,280 B1 | 7/2002 | Forrester et al. |
| 6,447,250 B1 | 9/2002 | Corrigan et al. |
| 6,457,942 B1 | 10/2002 | Forrester |
| 6,481,971 B1 | 11/2002 | Forrester |
| 6,520,742 B1 | 2/2003 | Forrester et al. |
| 6,634,863 B1 | 10/2003 | Forrester et al. |
| 6,739,837 B2 | 5/2004 | Barnette et al. |

(Continued)

*Primary Examiner* — Christopher J Besler
(74) *Attorney, Agent, or Firm* — Carlson, Gaskey & Olds, P.C.

(57) ABSTRACT

A platform for a fan of a gas turbine engine includes a body portion, a forward flange at a front of the body portion that includes an engagement feature that interacts with a forward flange of a lug of a hub of a fan of a gas turbine engine, and a pin integral with a rear portion of the body portion. The pin is receivable in an aperture in a rear flange of the lug.

11 Claims, 3 Drawing Sheets

(56) References Cited

U.S. PATENT DOCUMENTS

| | | |
|---|---|---|
| 6,846,159 B2 | 1/2005 | Zabawa et al. |
| 6,951,448 B2 | 10/2005 | Duesler et al. |
| 7,153,098 B2 | 12/2006 | Zabawa |
| 7,163,375 B2 | 1/2007 | Queriault et al. |
| 9,759,226 B2 * | 9/2017 | Duelm .................. F04D 29/023 |
| 2003/0194319 A1 | 10/2003 | Zabawa et al. |
| 2011/0243744 A1 | 10/2011 | Forgue et al. |

* cited by examiner

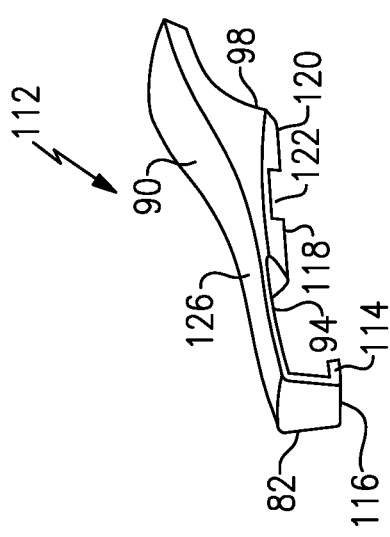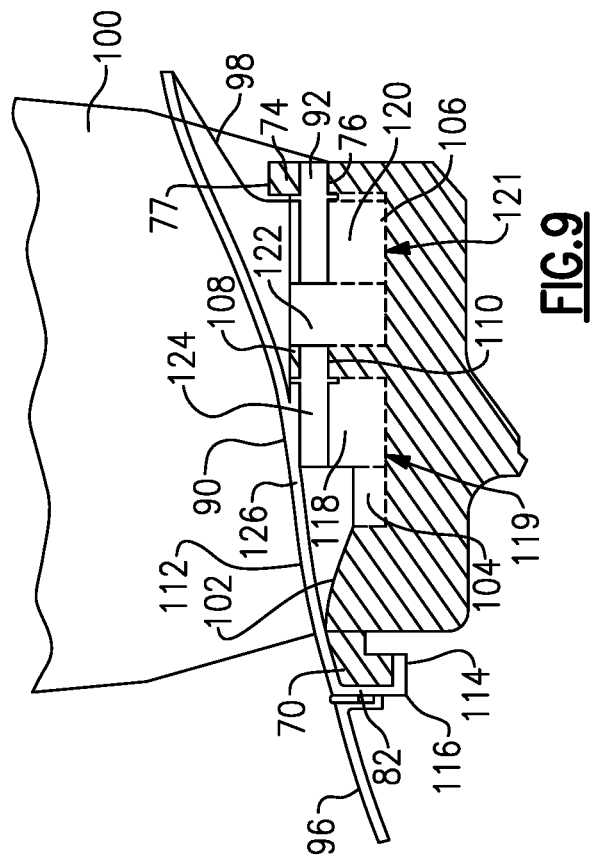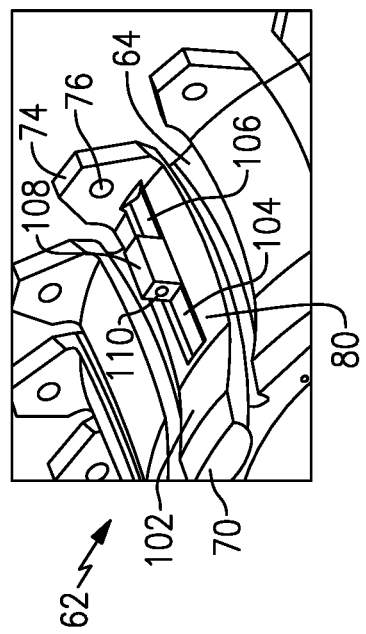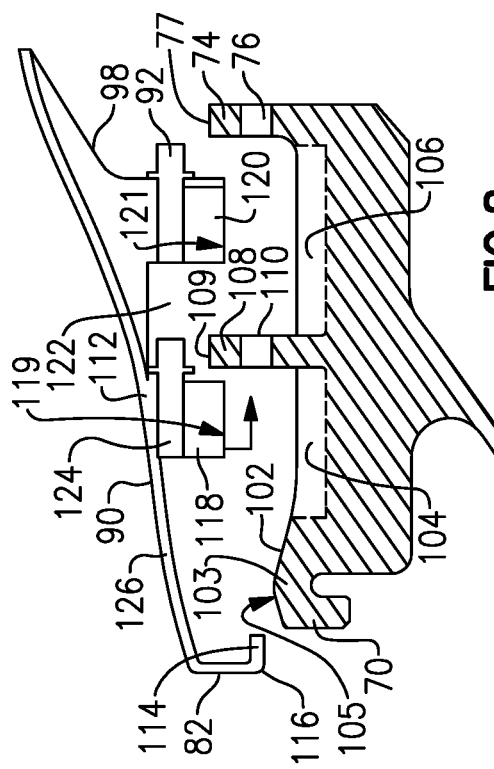

LOW PROFILE FAN PLATFORM ATTACHMENT

CROSS-REFERENCE TO RELATED APPLICATION

This application is a continuation of U.S. application Ser. No. 14/171,093 filed on Feb. 3, 2014, which claims priority to U.S. Provisional Application 61/765,199 filed Feb. 15, 2013.

BACKGROUND OF THE INVENTION

Fan spacer platforms are located between fan blades to create a smooth surface to direct air to the low pressure compressor. A fan spacer platform is usually integral with a fan blade or radially constrained to a hub by a separate single pin that passes through devises on the fan spacer platform. A geared turbofan gas turbine engine is small, creating spacial constraints, and it is difficult to employ a fan spacer platform that is integral with the fan blade.

SUMMARY OF THE INVENTION

A platform for a fan of a gas turbine engine according to an exemplary embodiment of this disclosure, among other possible things includes a body portion, a forward flange at a front of the body portion that includes an engagement feature that interacts with a forward flange of a lug of a hub of a fan of a gas turbine engine, and a pin integral with a rear portion of the body portion. The pin is receivable in an aperture in a rear flange of the lug.

In a further embodiment of any of the foregoing platforms, the platform is made of a graphic fiber epoxy composite.

In a further embodiment of any of the foregoing platforms, the engagement feature of the forward flange is a pin integral with the forward flange.

In a further embodiment of any of the foregoing platforms, the engagement feature of the forward flange is a projection that is substantially perpendicular to the forward flange.

In a further embodiment of any of the foregoing platforms, the pin is made of metal.

In a further embodiment of any of the foregoing platforms, the pin and body portion are co-molded.

In a further embodiment of any of the foregoing platforms, the body portion of the platform includes a radially inner surface including an elongated protruding portion that is receivable in an elongated trench on a radial outer surface of the lug, and the pin is integral with the elongated protruding portion.

In a further embodiment of any of the foregoing platforms, the body portion of the platform includes a radially inner surface including a forward elongated protruding portion and a rear elongated protruding portion separated by a space that are receivable in a forward elongated trench and a rear elongated trench, respectively, on a radially outer surface of the lug.

In a further embodiment of any of the foregoing platforms, the pin is integral with the rear elongated protruding portion and an another pin is integral with the forward elongated protruding portion, and the another pin is receivable in an aperture of a radially outwardly projecting lug located between the forward elongated trench and a rear elongated trench of the lug.

A fan of a gas turbine engine according to an exemplary embodiment of this disclosure, among other possible things includes a hub including a plurality of slots and a plurality of lugs, wherein each of the plurality of lugs includes a forward flange and a rear flange, and the rear flange includes an aperture, a plurality of fan blades, one of the plurality of fan blades is received in each of the plurality of slots of the hub, a plurality of platforms, each of the plurality of platforms is attached to one of the plurality of lugs, and each of the plurality of platforms includes a body portion, a forward flange at a front of the body portion including an engagement feature that interacts with the forward flange of one of the plurality of lugs, and a pin integral with a rear portion of the body portion that is received in the aperture in the rear flange of the one of the plurality of lugs.

In a further embodiment of any of the foregoing fans, the plurality of lugs are integral with the hub.

In a further embodiment of any of the foregoing fans, the plurality of platforms are made of a graphic fiber epoxy composite.

In a further embodiment of any of the foregoing fans, the engagement feature of the forward flange of each of the plurality of platforms is a pin integral with the forward flange.

In a further embodiment of any of the foregoing fans, the engagement feature of the forward flange of each of the plurality of platforms is a projection that is substantially perpendicular to the forward flange.

In a further embodiment of any of the foregoing fans, the pin of each of the plurality of platforms is made of metal.

In a further embodiment of any of the foregoing fans, the pin and the body portion of each of the plurality of platforms are co-molded.

In a further embodiment of any of the foregoing fans, each of the plurality of lugs includes a radial outer surface having an elongated trench and each of the plurality of platforms includes a radially inner surface having an elongated protruding portion that is receivable in the elongated trench, and the pin of each of the plurality of platforms is integral with the elongated protruding portion.

In a further embodiment of any of the foregoing fans, each of the plurality of lugs includes a radial outer surface having a front elongated trench and a rear elongated trench and each of the plurality of platforms includes a radially inner surface having a front elongated protruding portion and a rear elongated protruding portion separated by a space and that are received in the front elongated trench and the rear elongated trench, respectively.

In a further embodiment of any of the foregoing fans, each of the plurality of platforms includes another pin, and the pin of each of the plurality of platforms is integral with the rear elongated protruding portion and the another pin is integral with the forward elongated protruding portion, and the another pin is received in an aperture of a radially outwardly projecting lug located between the forward elongated trench and the rear elongated trench of the lug and received in the space between front elongated protruding portion and a rear elongated protruding portion.

In a further embodiment of any of the foregoing fans, includes a spinner attached to a forward end of the hub to axially retain the plurality of platforms.

These and other features of the present invention can be best understood from the following specification and drawings, the following of which is a brief description.

BRIEF DESCRIPTION OF THE DRAWINGS

FIG. 6 illustrates a hub of a fan including a second embodiment lug;

FIG. 7 illustrates a second embodiment platform;

FIG. 8 illustrates the installation of the platform of FIG. 7 on the hub of FIG. 6; and FIG. 9 illustrates the installed platform of FIG. 7 on the hub of FIG. 6.

DETAILED DESCRIPTION OF THE PREFERRED EMBODIMENT

Figure 1:
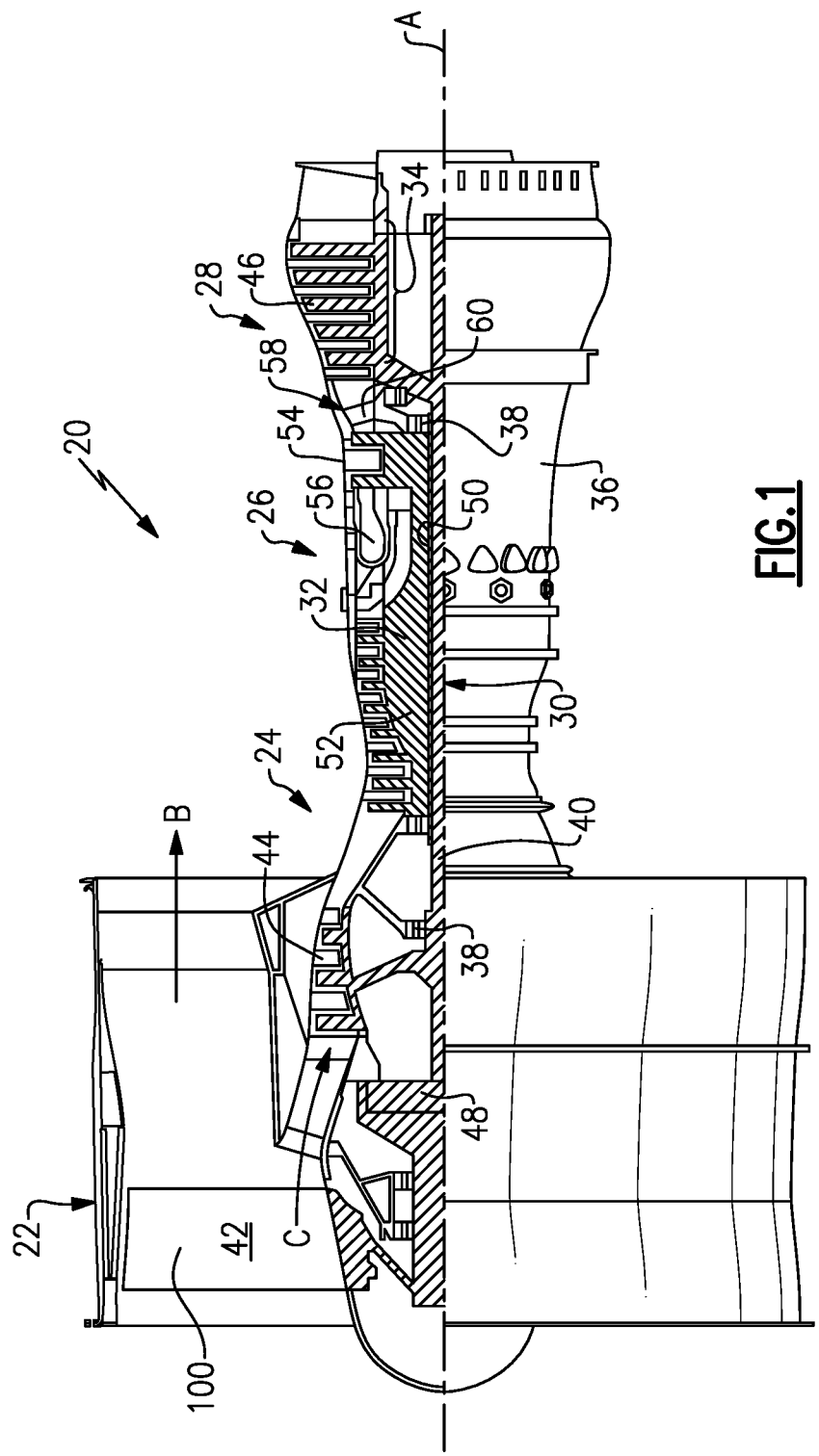
FIG. 1 illustrates a schematic view of an embodiment of a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to the combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a geared turbofan gas turbine engine, it should be understood that the concepts described herein are not limited to use with geared turbofans as the teachings may be applied to other types of traditional turbine engines. For example, the gas turbine engine 20 can have a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor 44 to a low pressure (or first) turbine 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor 52 and a high pressure (or second) turbine 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The air in the core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core flow path C and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the air in the bypass flow path B due to the high bypass ratio. The fan section 22 of the gas turbine engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

The example gas turbine engine includes the fan 42 that comprises in one non-limiting embodiment less than about 26 fan blades 100. In another non-limiting embodiment, the fan section 22 includes less than about 20 fan blades 100. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 100 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of fan blades 100 in the fan section 22 disclose an example gas turbine engine 20 with increased power transfer efficiency.

Figure 2:
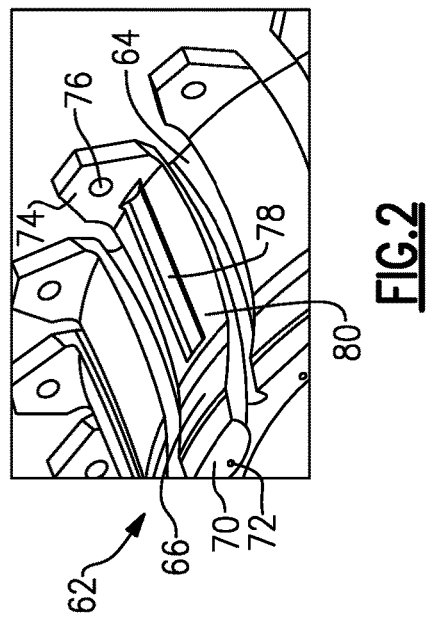
FIG. 2 illustrates a hub of a fan including a first embodiment lug.

FIG. 2 illustrates a first embodiment hub 62 of a fan 42. The hub 62 includes a plurality of slots 64 located between a plurality of lugs 66 that are integral with the hub 62. That is, the plurality of slots 64 and the plurality of lugs 66 alternate. Each of the slots 64 receives a fan blade 100 (shown in FIG. 5). Once installed, the fan blades 100 extend radially about the engine central longitudinal axis A.

A platform 68 (shown in FIG. 3) is attached to each of the lugs 66 in a manner that allows the platform 68 to be located more radially inward, which is beneficial due to the reduced packaging space in the fan 42. Each platform 68 contacts the two adjacent fan blades 100. Together, the platforms 68 and the fan blades 100 define a smooth, continuous and uninterrupted surface that directs the air to the low pressure compressor 44. A seal (not shown) can be located between the fan blades 100 and the platforms 68 to prevent air from flowing into the hub 62. In one example, the seal is made of rubber. In another example, the seal includes a fabric reinforcement. In another example, the seal is made of silicone.

Figure 3:
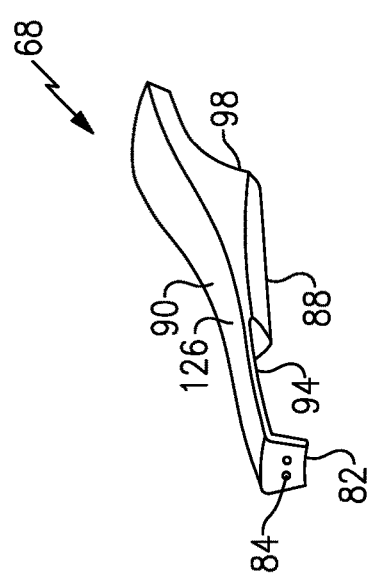
FIG. 3 illustrates a first embodiment platform.

Each lug 66 includes a forward flange 70 having at least one aperture 72 and a rear flange 74 including an aperture 76. An elongated trench 78 is located on a radially outer surface 80 of the lug 66 and allows the platform 68 to be installed more radially inwardly. The elongated trench 78 is provided between a first radial extension 69 of the lug 66 and the rear flange 74 which is a second radial extension that is aft of the first radial extension 69. The elongated trench 78 is disposed radially inward of the radially outer surface 80 of the first radial extension 69 and a radially outer surface 77 of the rear flange 74. The elongated trench 78 reduces the weight of the lug 66, while still providing enough structural material to support the fan blades 100. This allows the platform 68 to be employed with gas turbine engines 20 having a small fan diameter. This also allows the flowpath area to be maximized with a reduced weight FIG. 3 illustrates a first embodiment platform 68. The platforms 68 may be made of a graphite fiber epoxy composite, which reduces the weight. The platform may also be made of any other material that is known in the art. The platform 68 includes a body portion 126 and a forward flange 82 including at least one pin 84. The number of at least one pin 84 is equal to the number of at least one aperture 72 in the forward flange 70 of the lug 66. In one example, the at least one pin 84 is integral with the forward flange 82 of the platform 68.

The platform 68 also includes a pin 92 protruding from and attached to the rear portion 98 of body portion 126 of the platform 68. The pin 92 is integral with the body portion 126 of the platform 68. In one example, the pin 92 is made of metal. In another example, the pin 92 is a composite. The pin 92 can be molded with the platform 68 or secondarily bonded. If the pin 92 is molded with the platform 68, the already manufactured pin 92 is placed in a mold, and the platform 68 is co-molded with the pin 92. The platform 68 and the pin 92 are integral to define a single component. When the platform 68 is installed, the pin 92 is received in the aperture 76 in the rear flange 74 of the lug 66.

A radially inner surface 94 of the platform 68 includes an elongated protruding portion 88 that is sized to be received in the elongated trench 78 of the lug 66. The elongated protruding portion 88 has a radially inner surface 89. The elongated protruding portion 88 has an axial length L and a radial height H, and the axial length is greater than the radial height H. As the at least one pin 84 and the pin 92 are integral with the platform 68, the total part count is also reduced.

Figure 4:
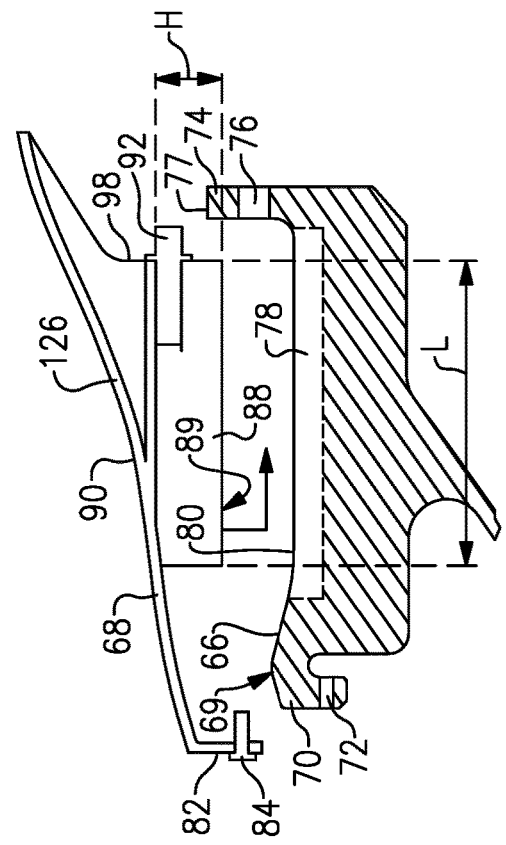
FIG. 4 illustrates the installation of the platform of FIG. 3 on the hub of FIG. 2.

When assembling the fan 42, each of the fan blades 100 are first installed in one of the slots 64. A locking ring (not shown) is then added to retain the fan blades 100 in position. The platforms 68 are then installed. As shown in FIG. 4, when installing the platforms 68 on the lug 66, the platform 68 is located over the lug 66 and then radially lowered such that the elongated protruding portion 88 is received in the elongated trench 78, allowing the platform 68 to be located more radially inward. This lowers the profile of the platform 68 relative to the hub 62. The platform 68 is then slid axially aft such that the at least one pin 84 of the forward flange 82 of the platform 68 and the pin 92 protruding from and attached to the rear portion 98 of body portion 126 of the platform 68 are received in the at least one aperture 72 and the aperture 76, respectively, of the lug 66. The at least one pin 84 and the pin 92 provide radial retention of the platforms 68.

In another example, as described below, a projection is substantially perpendicular to the forward flange 82 and extends from a bottom of the forward flange 82. The forward flange 82 and the projection wrap around the forward flange 70 of the lug 66. In this example, the forward flange 82 does not include the at least one pin 84. Alternately, the forward flange 82 does not include either the projection or the pin 84, and the contact of the forward flange 82 and the spinner 96 retains the platform 68 in place.

Figure 5:
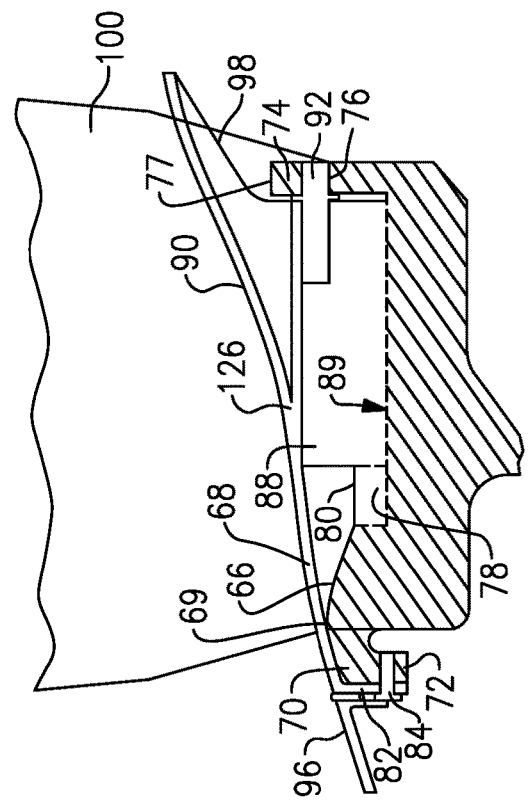
FIG. 5 illustrates the installed platform of FIG. 3 on the hub of FIG. 2.

As shown in FIG. 5, once the platforms 68 are installed, a nose cone or spinner 96 is attached to a forward end of the hub 62 to provide axial retention of the platforms 68. Also, once the platforms 68 are installed, the radially inner surface 89 of the elongated protruding portion 88 is disposed radially inward of the radially outer surface 80 of the first radial extension 69 and the outer radial surface 77 of the rear flange 74. The forward flange 70 and the rear flange 74 of the lug 66 also provide for axial retention.

FIG. 6 illustrates a second embodiment lug 102. The lug 102 includes the same features of the lug 66 of FIG. 2 except as described below. The lug 102 includes a forward trench 104 and a rear trench 106 separated by a radially outwardly projecting lug 108. The radially outwardly projecting lug 108 includes an aperture 110. Additionally, the forward flange 70 does not include the at least one aperture.

FIG. 7 illustrates a second embodiment platform 112. A projection 114 that is substantially perpendicular to the forward flange 82 extends from a bottom 116 of the forward flange 82. The forward flange 82 and the projection 114 wrap around the forward flange 70 of the lug 102. The forward flange 82 does not include the at least one pin.

In another example, as described above, the forward flange 82 does not include the projection 114, but instead includes at least one pin received in at least one aperture of the lug 102. Alternately, the forward flange 82 does not include either the projection 114 or the pin, and the contact of the forward flange 82 and the spinner 96 retains the platform 112 in place.

The platform 112 also includes a pin 92 protruding from and integral with a rear portion 98 of the body portion 126 of the platform 112. The platform 112 also includes a pin 124 located forward of the pin 92. In one example, the pins 92 and 124 are made of metal. In another example, the pins 92 and 124 are a composite. The pins 92 and 124 can be molded with the platform 112 or secondarily bonded. If the pins 92 and 124 are molded with the platform 112, the already manufactured pins 92 and 124 are placed in a mold, and the platform 112 is co-molded with the pins 92 and 124. However, the platform 112 and the pins 92 and 124 are integral to define a single component. The pins 92 and 124 are received in the aperture 76 of the rear flange 74 of the lug 102 and the aperture 110 of the radially outwardly projecting lug 108, respectively.

A radially inner surface 94 of the platform 112 includes a forward elongated protruding portion 118 having a radially inner surface 119 and a rear elongated protruding portion 120 having a radially inner surface 112. The forward elongated protruding portion 118 and rear elongated protruding portion 120 are separated by a space 122. The forward elongated protruding portion 118 and the rear elongated protruding portion 120 are each sized to allow the forward elongated protruding portion 118 and the rear elongated protruding portion 120 to be received in the forward trench 104 and the rear trench 106 of the lug 102, respectively. The forward trench 104 is provided between a radial extension 103 of the lug 102 and the radially outwardly projecting lug 108, and is disposed radially inward of a radially outer surface 105 of the radial extension 103 and a radially outer surface 109 of the radially outwardly projecting lug 108. The rear trench 106 is provided between the radially outwardly projecting lug 108 and the rear flange 74, and is disposed radially inward of the radially outer surface 109 of the radially outwardly projecting lug 108 and the radially outer surface 77 of the rear flange 74.

When assembling the fan 42, the fan blades 100 are first installed in one of the slots 64. A locking ring (not shown) is then added to retain the fan blades 100 in position. The platforms 112 are then installed. As shown in FIG. 8, when installing the platform 112 on the lug 102, the platform 112 is located over the lug 102 and then radially lowered such that the forward elongated protruding portion 118 and a rear elongated protruding portion 120 of the platform 112 are received in the forward trench 104 and the rear trench 106, respectively, of the lug 102, allowing the platform 112 to be located more radially inward. This lowers the profile of the platform 112 relative to the hub 62. The radially outwardly projecting lug 108 is received in the space 122 between the forward elongated protruding portion 118 and a rear elongated protruding portion 120. The platform 112 is then slid axially aft such that the pins 124 and 92 of the platform 112 are received in the apertures 110 and 76, respectively, of the radially outwardly projecting lug 108 and the rear flange 74, respectively, of the lug 102. The pins 124 and 92 provide radial retention of the platforms 112.

As shown in FIG. 9, once the platform 112 is installed, the radially inner surface 119 of forward elongated protruding portion 118 and the radially inner surface 121 of rear elongated protruding portion 120 are radially inward of the radially outer surface 105 of the radial extension 103, the radially outer surface 109 of the outwardly projecting lug 108, and the radially outer surface 77 of rear flange 74. Also, once the platform 112 is installed, a nose cone or spinner 96 is attached to a forward end of the hub 62 to provide axial retention of the platforms 112. The forward flange 70 and the rear flange 74 also provide forward axial retention.

Although a gas turbine engine 20 with geared architecture 48 is described, the platforms 68 and 112 can be employed in a gas turbine engine without geared architecture.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A fan of a gas turbine engine comprising:
a hub including a plurality of slots and a plurality of lugs, wherein each of the plurality of lugs includes a forward flange, a rear flange, and a radially outer surface, and the rear flange includes an aperture;
a plurality of fan blades, wherein each one of the plurality of fan blades is received in a respective one of each of the plurality of slots of the hub; and
a plurality of platforms, wherein each of the plurality of platforms is attached to one of the plurality of lugs, and each of the plurality of platforms includes a body portion including an elongated protruding portion having a radially inner surface, and the elongated protruding portion of each of the plurality of platforms, including the radially inner surface, is received in an elongated recessed trench of each respective one of the plurality of lugs;
wherein for each lug, the elongated recessed trench is provided between a first radial extension of the lug and the rear flange of the lug which is aft of the first radial extension, and the elongated recessed trench is recessed relative to a respective radially outer surface of each of the first radial extension and the rear flange of the lug;
wherein the radially inner surface of the elongated protruding portion of each of the plurality of platforms is positioned radially inward with respect to the respective radially outer surface of each of the first radial extension and rear flange of the corresponding lug to which it is attached; and
wherein a forward flange at a front of the body portion includes an engagement feature that interacts with the forward flange of one of the plurality of lugs.

2. The fan as recited in claim 1 wherein the plurality of lugs are integral with the hub.

3. The fan as recited in claim 1 wherein the engagement feature of the forward flange of the body portion of each of the plurality of platforms is a pin integral with the forward flange of the body portion.

4. The fan as recited in claim 1 wherein the engagement feature of the forward flange of the body portion of each of the plurality of platforms is a projection substantially perpendicular to the forward flange of the body portion.

5. The fan as recited in claim 3 wherein the pin and the body portion of each of the plurality of platforms are co-molded.

6. The fan as recited in claim 3 wherein the pin of each of the plurality of platforms is integral with the elongated protruding portion.

7. The fan as recited in claim 1 wherein:
the elongated recessed trench of each of the plurality of lugs includes a front elongated trench and a rear elongated trench separated by a second extension of the lug that is disposed between the first radial projection and the rear flange; and the elongated protruding portion includes a front elongated protruding portion and a rear elongated protruding portion separated by a space, the front elongated protruding portion and rear elongated protruding portion are received in the front elongated trench and the rear elongated trench, respectively.

8. The fan as recited in claim 7 wherein each of the plurality of platforms includes another pin, and the pin of each of the plurality of platforms is integral with the rear elongated protruding portion and the another pin is integral with the forward elongated protruding portion, and the another pin is received in an aperture of the second radial extension, the second radial extension comprising a radially outwardly projecting lug.

9. The fan as recited in claim 1 including a spinner attached to a forward end of the hub to axially retain the plurality of platforms.

10. The fan as recited in claim 1 wherein each of the plurality of platforms includes a pin integral with a rear portion of the body portion, and the pin is receivable in an aperture in a rear flange of one of the plurality of lugs.

11. The fan as recited in claim 1, wherein a length of the elongated protruding portion in an axial direction is greater than a height of the elongated protruding portion in a radial direction.

* * * * *